(12) United States Patent
Haas et al.

(10) Patent No.: US 10,116,423 B2
(45) Date of Patent: Oct. 30, 2018

(54) INTER-CARRIER MODULATION

(75) Inventors: Harald Haas, Edinburgh (GB); Rami Ismail Taha Abu-Alhiga, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 572 days.

(21) Appl. No.: 13/394,663

(22) PCT Filed: Sep. 10, 2010

(86) PCT No.: PCT/GB2010/001714
§ 371 (c)(1),
(2), (4) Date: May 25, 2012

(87) PCT Pub. No.: WO2011/030109
PCT Pub. Date: Mar. 17, 2011

(65) Prior Publication Data
US 2012/0250637 A1    Oct. 4, 2012

(30) Foreign Application Priority Data

Sep. 11, 2009 (GB) .................................. 0916001.1

(51) Int. Cl.
*H04L 5/00* (2006.01)
*H04L 27/00* (2006.01)

(52) U.S. Cl.
CPC ........ *H04L 5/0046* (2013.01); *H04L 27/0008* (2013.01)

(58) Field of Classification Search
None
See application file for complete search history.

(56) References Cited

U.S. PATENT DOCUMENTS 5,946,414 A * 8/1999 Cass et al. .................... 382/183
7,706,456 B2 4/2010 Laroia et al.
(Continued)

FOREIGN PATENT DOCUMENTS

EP           1617582 A1    1/2006
JP        2001-148678 A    5/2001
(Continued)

OTHER PUBLICATIONS

International Search Report/Written Opinion for Application No. PCT/GB2010/001714 dated Feb. 10, 2011
(Continued)

*Primary Examiner* — Chirag G Shah
*Assistant Examiner* — Suk Jin Kang
(74) *Attorney, Agent, or Firm* — Alston & Bird LLP

(57) ABSTRACT

A method and apparatus for communicating information by: dividing the information into at least a first information portion and a second information portion; modulating a plurality of domain resources to encode the first information using an index or grammar; and encoding the second information by modulation of domain resources. Optionally, the plurality of domain resources may be modulated to encode the first information by allocating at least two different modulation types to a plurality of sub-carriers. The modulation type is allocated to domain resources according to the index or grammar, which applies meaning to which modulation type is allocated to which domain resource. The modulation may include encoding part of the first information portion using one or more domain resources of a first domain and another part of the first information portion using one or more domain resources of a second domain.

52 Claims, 7 Drawing Sheets

(56) References Cited

U.S. PATENT DOCUMENTS

| | | | |
|---|---|---|---|
| 2002/0136317 A1* | 9/2002 | Oelcer | H04L 1/0057 375/261 |
| 2003/0037298 A1* | 2/2003 | Eleftheriou | G11B 20/1833 714/752 |
| 2003/0064690 A1* | 4/2003 | Kasapi | H04B 7/0615 455/101 |
| 2003/0074626 A1* | 4/2003 | Coker | H03M 13/1117 714/752 |
| 2006/0128323 A1* | 6/2006 | Fujimoto | 455/101 |
| 2007/0047665 A1* | 3/2007 | Friend | 375/260 |
| 2007/0121742 A1* | 5/2007 | Tamaki et al. | 375/260 |
| 2008/0063095 A1* | 3/2008 | Khayrallah | H04L 1/0009 375/260 |
| 2009/0180572 A1* | 7/2009 | Bar-Ness et al. | 375/295 |
| 2011/0051657 A1* | 3/2011 | Li et al. | 370/328 |
| 2012/0069755 A1* | 3/2012 | Li et al. | 370/252 |
| 2012/0294295 A1* | 11/2012 | Webster et al. | 370/338 |
| 2013/0064314 A1* | 3/2013 | Ko et al. | 375/260 |
| 2013/0100995 A1* | 4/2013 | Tsai et al. | 375/219 |
| 2013/0114760 A1* | 5/2013 | Taylor et al. | 375/295 |
| 2013/0208824 A1* | 8/2013 | Wang et al. | 375/295 |

FOREIGN PATENT DOCUMENTS

| | | | |
|---|---|---|---|
| JP | 2003-244091 A | 8/2003 | |
| JP | 2004-328255 A | 11/2004 | |
| JP | 2008-533818 A | 8/2008 | |
| WO | WO 2006/096678 A1 | 9/2006 | |
| WO | WO 2006096678 A1 * | 9/2006 | |
| WO | WO 2008110616 A1 * | 9/2008 | H04L 27/2618 |

OTHER PUBLICATIONS

Japan Patent Office, Notification of Reason(s) for Refusal for Application No. 2012-528447, dated Sep. 29, 2014, 6 pages, Japan.

* cited by examiner

Dividing the information into at least a first portion and a second portion ~ 4

↓

Encoding the first portion by allocating at least two different modulation types to a plurality of subcarriers ~ 6

↓

Encoding the second portion by modulation of subcarriers belonging to a subset of the plurality of subcarriers ~ 8

Fig. 1  ↖ 2

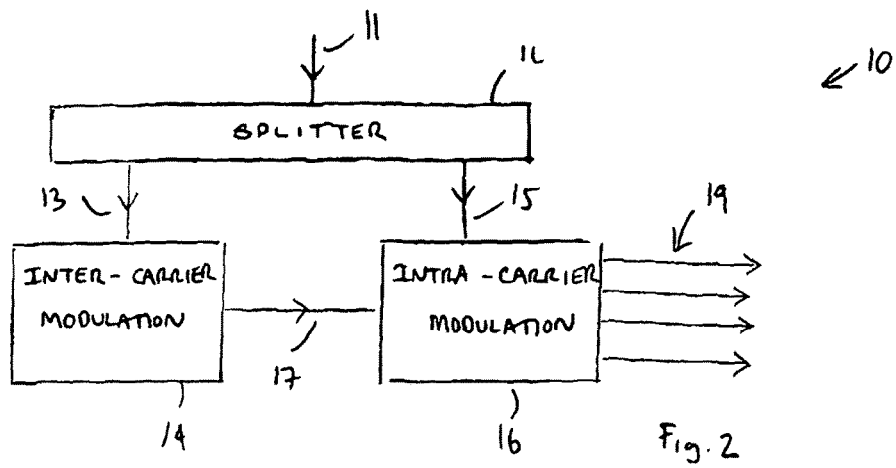

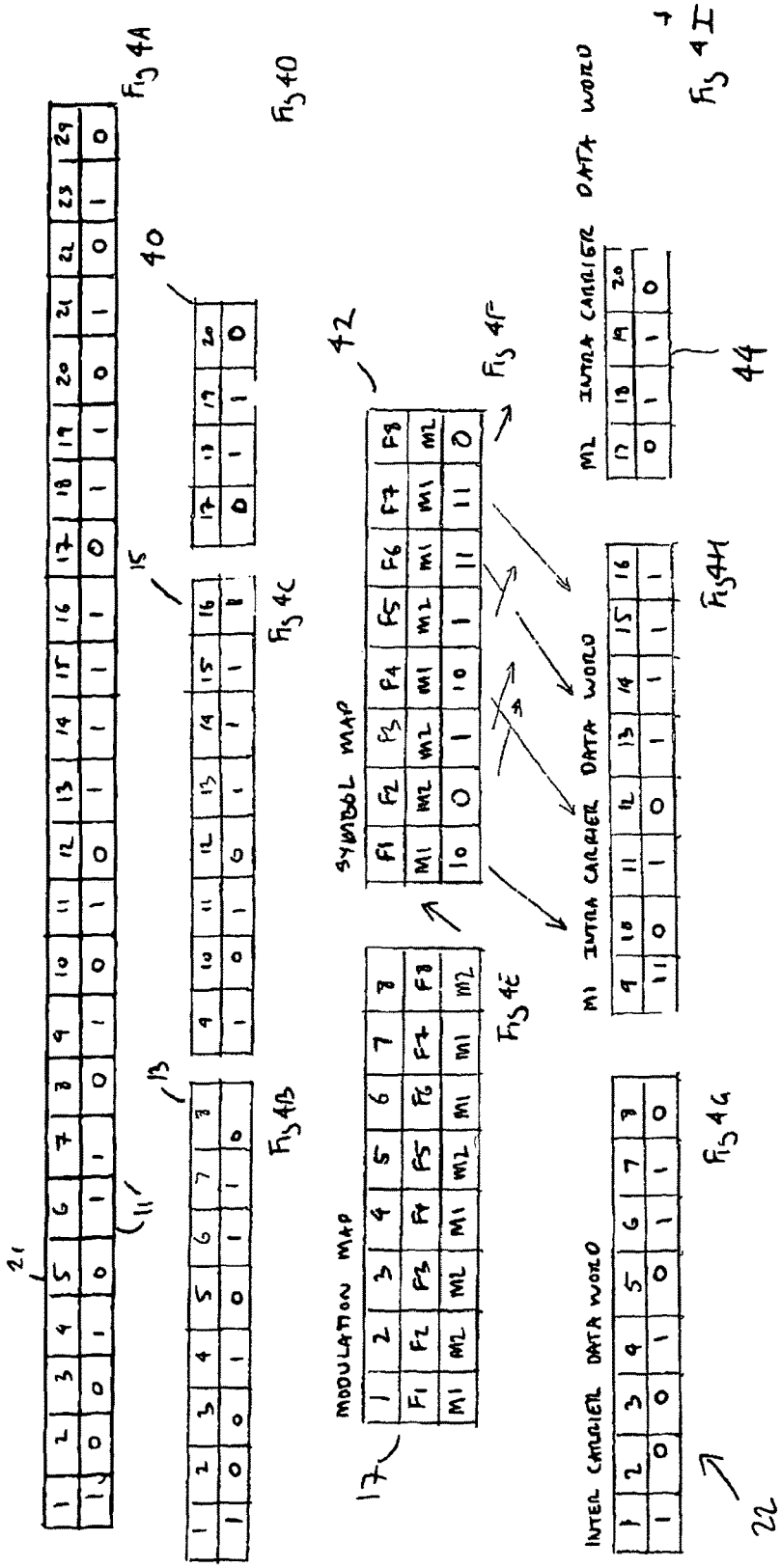

INTER-CARRIER MODULATION

CROSS-REFERENCE TO RELATED APPLICATIONS

This application is a National Stage Application, filed under 35 U.S.C. § 371, of International Application No. PCT/GB2010/001714, filed Sep. 10, 2010, which claims priority to Great Britain Application No. 0916001.1, filed Sep. 11, 2009, the contents of both of which as are hereby incorporated by reference in their entirety.

FIELD OF THE INVENTION

Embodiments of the present invention relate to communicating information by modulating multiple carriers. In particular, embodiments of the present invention relate to communicating information by modulating orthogonal frequency division multiplexing (OFDM) subcarriers.

BACKGROUND TO THE INVENTION

Modulation is a technique by which a carrier wave is modified or modulated to encode information.

As an example, for a fixed frequency carrier wave, modulation of the carrier wave may be achieved by varying the amplitude of the carrier wave or the phase of the carrier wave to encode information. To improve disambiguation between different encoded information, the variation of the amplitude of the carrier wave or the phase of the carrier wave to encode information is typically discrete.

To increase bandwidth (the amount of information transmitted per second) the carrier wave may be separated into orthogonal components (I and Q components) that differ in phase by $\pi/2$ radians. The orthogonal components are then independently modulated.

Examples of current modulation techniques include, for example, binary phase shift keying (BPSK) and multilevel quadrature amplitude modulation (M-QAM).

Modulation increases information transmission rates by enabling that within a given bandwidth more information is conveyed (upper bounded by the Shannon equation).

In orthogonal division multiple multiplexing (OFDM), multiple carrier waves are defined. These subcarriers are orthogonal to each other. This enables each subcarrier to be independently modulated.

It would be desirable to provide for better data transmission and reception.

BRIEF DESCRIPTION OF VARIOUS EMBODIMENTS OF THE INVENTION

According to various, but not necessarily all, embodiments of the invention there is provided embodiments including embodiments as defined by the appended claims.

According to a first aspect of the invention is a method of communicating information comprising dividing the information into at least a first information portion and a second information portion; modulating a plurality of domain resources to encode the first information using an index or grammar; and encoding the second information by modulation of domain resources.

Modulating the plurality of domain resources to encode the first information may comprise allocating at least two different modulation types to a plurality of sub-carriers.

Encoding the first information portion may comprise selecting which modulation type is allocated to which domain resource according to the index or grammar, which applies meaning to which modulation type is allocated to which domain resource.

Modulating the plurality of domain resources to encode the first information may comprise encoding at part of the first information portion using one or more domain resources of a first domain and another part of the first information portion is encoded using one or more domain resources of a second domain.

Modulating the plurality of domain resources to encode the first information may comprise encoding at least a further part of the first information portion using one or more domain resources of a third domain.

The first, second and/or third domains may comprise the frequency, time and/or spatial domains and/or the domain resources may comprise sub-channels of a frequency domain, beams arranged in a spatial domain and/or time slots in a time domain.

Values may be associated with domain resources of at least one domain and wherein at least part of the first information portion is encoded by providing a signal using a domain resource indicative of the value of the portion of the data.

Values may be associated with domain resources of at least two domains, and wherein the first information portion is at least partially encoded by providing a signal using domain resources from the at least two domains indicative of the value of parts of the first information portion.

According to a further aspect of the present invention is a method of communicating information comprising dividing the information into at least a first information portion and a second information portion; encoding the first information portion by allocating at least two different modulation types to a plurality of subcarriers; and encoding the second information by modulation of subcarriers belonging to a subset of the plurality of subcarriers.

Encoding the first information portion may comprise selecting which modulation type is allocated to which subcarrier according to a grammar that applies meaning to which modulation type is allocated to which subcarrier.

Each subcarrier may be associated with an index in a ordered series of indexes, wherein the modulation type of a subcarrier assigns a value to the associated index and wherein assigned values, ordered according to the ordered series of indexes, provide a data word representing the first information portion.

The method may comprise encoding the first information portion by allocating only two different modulation types to the subcarriers.

The first information portion may comprise a first subset of information bits and a second subset of information bits. The method may further comprise selecting a first information encoding scheme from a plurality of different first information encoding schemes, each of which has a different allocation of modulation types to the first and second subsets.

The plurality of different first information encoding schemes may be predetermined and shared with a receiver.

The method may comprise transmitting control information that identifies the selected first information encoding scheme.

The method may comprise encoding the control information by modulation of subcarriers.

The method may comprise identifying within the first information portion a first subset of information bits and a second subset of information bits; selecting the majority subset of the first and second subsets; and using the majority subset to allocate a first modulation type to a first plurality of subcarriers.

The method may comprise selecting a first information encoding scheme, for determining the allocation of the at least two different modulation types amongst the plurality of subcarriers, that maximises the available bandwidth for the remaining information portions.

The method may comprise utilising some of the bandwidth for encoding control information and/or for degenerate encoding a portion of the second information portion.

At least two different modulation types may comprise a first modulation type that modulates a subcarrier with a first fixed amplitude and a second modulation type that modulates a subcarrier with a second fixed amplitude.

At least two different modulation types may enable on-off keying (OOK), the first amplitude representing suppression of subcarriers and the second amplitude representing non suppression of the subcarriers.

The method may comprise power reallocation from the suppressed subcarriers to the non suppressed subcarriers.

At least two different modulation types may comprise a first modulation type that modulates a subcarrier with a higher order modulation and a second modulation type that modulates a subcarrier with a lower order modulation.

The plurality of subcarriers may comprise subcarriers of two or more domains, for example, the frequency domain, the time domain and the spatial domain.

According to a second aspect of the invention is a transmitter apparatus comprising: means for dividing the information into at least a first information portion and a second information portion; means for encoding the first information portion by allocating at least two different modulation types to a plurality of subcarriers; and means for encoding the second information by modulation of subcarriers belonging to a subset of the plurality of subcarriers.

The transmitter apparatus may comprise means for performing the method of the first aspect.

According to a third aspect of the invention is a transmitter apparatus comprising: splitter circuitry configured to divide the information into at least a first information portion and a second information portion; inter-carrier modulation circuitry configured to encode the first information portion by allocating at least two different modulation types to a plurality of subcarriers; and intra-carrier modulation circuitry configured to encode the second information by modulation of subcarriers belonging to a subset of the plurality of subcarriers.

According to a fourth aspect of the invention is a method of communicating information comprising: decoding first information portion by determining the allocation of at least two different modulation types to a plurality of subcarriers; and decoding second information by demodulation of subcarriers belonging to a subset of the plurality of subcarriers; and combining the first information portion and the second information portion.

Decoding the first information portion may comprise determining which modulation type is allocated to which subcarrier and applying meaning according to a grammar that applies meaning to which modulation type is allocated to which subcarrier.

Each subcarrier may be associated with an index in a ordered series of indexes, wherein the modulation type of a subcarrier assigns a value to the associated index and wherein assigned values, ordered according to the ordered series of indexes, provide a data word representing the first information portion.

The method may comprise determining which modulation type is allocated to which subcarrier; decoding the first information portion according to different encoding schemes by applying meaning according to a grammar which applies a meaning to which modulation types are allocated to which subcarriers, wherein each encoding scheme has its own grammar; and selecting one of the first information portions created according to different encoding schemes.

The method may comprise identifying the encoding scheme is use; and decoding the first information portion by determining which modulation type is allocated to which subcarrier and applying meaning according to a grammar of the identified encoding scheme that applies meaning to which modulation type is allocated to which subcarrier.

At least two different modulation types may comprise a first modulation type that modulates a subcarrier with a higher order modulation and a second modulation type that modulates a subcarrier with a lower order modulation.

According to a fifth aspect of the invention is a receiver apparatus comprising: means for decoding first information portion by determining the allocation of at least two different modulation types to a plurality of subcarriers; means for decoding second information by demodulation of subcarriers belonging to a subset of the plurality of subcarriers; and means for combining the first information portion and the second information portion;

The receiver apparatus may comprise means for performing the method of the fourth aspect.

According to a sixth aspect of the invention is a receiver apparatus comprising: inter-carrier modulation detection circuitry configured to decode first information portion by determining the allocation of at least two different modulation types to a plurality of subcarriers; intra-carrier demodulation circuitry configured to decode second information by demodulation of subcarriers belonging to a subset of the plurality of subcarriers; and combiner circuitry configured to combine the first information portion and the second information portion.

According to a seventh aspect of the invention is a system comprising the receiver apparatus of the sixth aspect and the transmitter apparatus of the sixth aspect.

According to an eighth aspect of the invention is a method or apparatus substantially as illustrated in the drawings and/or as described with reference to the drawings.

According to a ninth aspect of the invention is a method of communicating information comprising: dividing the information into at least a first information portion and a second information portion; communicating the first information portion by allocating an operational pattern to a plurality of wireless channels; and communicating the second information by wireless communication via one or more of the wireless channels.

The wireless channels may have a plurality of potential different states wherein the first information is communicated by allocating a state for each wireless channel, wherein the collection of states form the operational pattern.

The wireless channels may include orthogonal subcarriers that have different modulation states.

The wireless channels may include time slots that have different modulation states.

According to a tenth aspect of the invention is a method of communicating information comprising: dividing the information into at least a first information portion and a second information portion; encoding the first information portion by allocating at least two different modulation types to a plurality of orthogonal multiplexing domain subunits; and encoding the second information by modulation of orthogonal multiplexing domain subunits belonging to a subset of the plurality of orthogonal multiplexing domain subunits.

According to an eleventh aspect of the invention is a method of communicating information comprising: dividing the information into at least a first information portion and a second information portion; encoding the first information using domain resource-index modulation; and encoding the second information by modulation of domain resources.

According to a twelfth aspect of the invention is a method of communicating information comprising: dividing the information into at least a first information portion and a second information portion; encoding the first information using inter-domain resource differentiation; and encoding the second information by modulation of domain resources.

According to a thirteenth aspect of the invention is a method of communicating information comprising: dividing the information into at least a first information portion, a second information portion and a third information portion; encoding the first information portion by allocating at least two different modulation types to a plurality of first orthogonal multiplexing domain subunits; encoding the second information portion by allocating at least two different modulation types to a plurality of second orthogonal multiplexing domain subunits; and encoding the third information by modulation of orthogonal multiplexing domain subunits belonging to a subset of the plurality of first orthogonal multiplexing domain subunits and second orthogonal multiplexing domain subunits.

According to a fourteenth aspect of the invention is a method of communicating information comprising: dividing the information into at least N portions; encoding the each one of M of the N portions by allocating at least two different modulation types to a plurality of orthogonal multiplexing domain subunits; and encoding the N−M portion(s) by modulation of orthogonal multiplexing domain subunits.

The method may comprise encoding at least one of the M portions by allocating at least $2^M$ different modulation types to a plurality of orthogonal multiplexing domain subunits.

The plurality of orthogonal multiplexing domain subunits may comprise domain subunits from at least two domains, for example, the frequency domain, the time domain and the spatial domain.

BRIEF DESCRIPTION OF THE DRAWINGS

For a better understanding of various examples of embodiments of the present invention reference will now be made by way of example only to the accompanying drawings in which:

FIG. 1 schematically illustrates a method of communicating information;

FIG. 2 schematically illustrates a suitable encoding/transmitter apparatus 10;

FIGS. 3A to 3G schematically illustrate an example of how information (FIG. 3A) is divided into a first information portion (FIG. 3B) and a second information portion (FIG. 3C), the allocation of different modulations types to different orthogonal subcarriers based on the first information portion (FIG. 3D), which symbols from the second information portion are modulated onto which subcarriers (FIG. 3E), the recovery of a data word representing the first information portion (FIG. 3F) and the recovery of a data word representing the second information portion (FIG. 3G);

FIGS. 4A to 4I schematically illustrate an example of how information (FIG. 4A) is divided into a first information portion (FIG. 4B), a second information portion (FIG. 4C) and a third information portion (FIG. 4D), which different modulations types are allocated to which orthogonal subcarriers based on the first information portion (FIG. 4E), which symbols from the second information portion are modulated onto which subcarriers and which symbols from the third information portion are modulated onto which subcarriers (FIG. 4F), the recovery of a data word representing the first information portion (FIG. 4G), the recovery of a data word representing the second information portion (FIG. 4H) and the recovery of a data word representing the third information portion (FIG. 4I);

DETAILED DESCRIPTION OF VARIOUS EMBODIMENTS OF THE INVENTION

Figure 5:
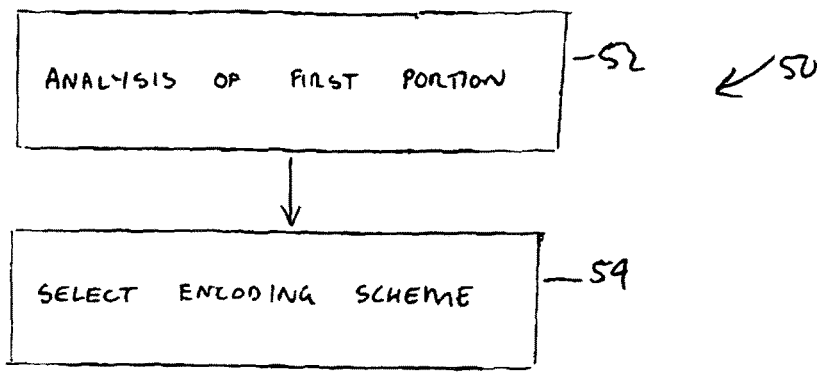
FIG. 5 schematically illustrates a method for selecting an encoding scheme from a plurality of different encoding schemes, each of which has a different allocation of modulation types to the first information portion.

FIG. 1 schematically illustrates a method 2 of communicating information. The method comprises a series of sequential blocks 4, 6, 8.

At block 8, information is divided into at least a first information portion and a second information portion.

As illustrated in FIG. 3A, the information 11 may be a series of information bits, such as, for example the series of binary bits illustrated.

As illustrated in FIGS. 3B and 3C, the first information portion 13 and the second information portion 15 are non-overlapping portions of the information 11.

Referring back to FIG. 1, at block 6 the first information portion 13 is encoded by allocating at least two different modulation types to a plurality of orthogonal frequency division multiplex (OFDM) subcarriers.

An example of an allocation of different modulations types M1, M2 to orthogonal subcarriers F1 to F8 is illustrated in FIG. 3D. This Fig illustrates a modulation map 17 that records which modulation type is allocated to which subcarrier.

Encoding the first information portion 13 comprises selecting which modulation type is allocated to which subcarrier according to a grammar that applies meaning to which modulation type is allocated to which subcarrier.

The modulation map has an ordered series of indexes 21. In this example the indexes increase sequentially from 1 to 8. Each of the indexes 21 is associated with a particular information bit of the first information portion 13. Each of the subcarriers F1-F8 is associated with a particular index 21. The bit value of the first information portion 13 at a particular index assigns the modulation type of the subcarrier associated with that index.

In this example, it can be observed that the grammar assigns the modulation type M1 to bit values of 1 in the first information portion 13 and the modulation type M2 to a bit values of 0 in the first information portion 13.

The grammar is shared with a receiver so that the receiver by detecting the modulation types of the subcarriers can reproduce the first information portion 13 as the data word 22. At the receiver, the modulation type of a subcarrier assigns a value to the associated index. The assigned values, ordered according to the ordered series of indexes, provide a data word 22 representing the first information portion 11 as illustrated in FIG. 3F.

Encoding of the first information portion 13, results in different modulation types being used with different subcarriers. In the example of FIG. 3D, two different types of modulation M1, M2 are used. A first subset of the eight subcarriers (subcarriers F1, F4, F6, F7) are modulated using the first type of modulation M1. A second subset of the eight subcarriers (subcarriers F2, F3, F5, F8) are modulated using the second type of modulation M2.

Referring back to FIG. 1, next at block 8 the second information portion 15 is encoded by modulation of subcarriers belonging to a subset of the plurality of subcarriers.

Referring to FIG. 3E, a symbol map 20 records which symbols are modulated onto which subcarriers. The second information portion 15 is divided into symbols and each symbol is modulated, in order, onto a subcarrier. In this example, all the symbols are modulated onto only the first subset of the eight subcarriers (subcarriers F1, F4, F6, F7).

In summary, the block 6, encodes the first information portion 13 using inter-carrier modulation. Information is encoded by creating differences between subcarriers. The first information portion 13 is encoded by allocating modulation types to subcarriers according to a grammar that applies meaning to which modulation type is allocated to which subcarrier. The block 8, encodes the second information portion using intra-carrier modulation. A symbol is encoded by creating detectable differences (e.g. phase and/or amplitude) within a subcarrier.

FIG. 2 schematically illustrates a suitable encoding apparatus 10. The apparatus 10 comprises a splitter block 12, an inter-carrier modulation block 14 and an intra-carrier modulation block 16. In this example, the splitter block performs block 4 of the method 2. The inter-carrier modulation clock 14 performs block 6 of the method 2. The intra-carrier modulation block 16 performs block 8 of the method 2.

The blocks may be implemented using software, hardware or a combination of software and hardware.

The splitter block 12 divides the information 11 into at least a first information portion 13 and a second information portion 15.

The inter-carrier modulation block 14 encodes the first information portion 13 by allocating at least two different modulation types to a plurality of subcarriers.

The intra-carrier modulation block 16, receives data 17 identifying the allocation of modulation types to subcarriers by the inter-carrier modulation block 14, and encodes the second information portion 15 by modulation of a subset of the subcarriers. The modulated subcarriers 19 are then transmitted.

Figure 6:
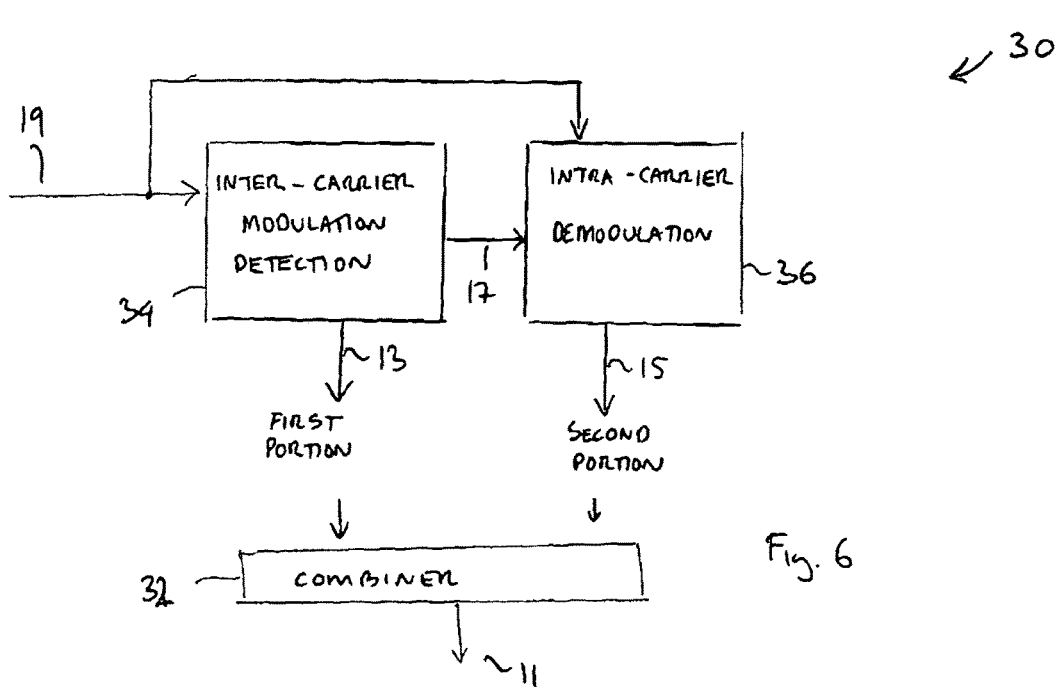
FIG. 6 schematically illustrates a suitable decoding/receiver apparatus.

FIG. 6 schematically illustrates a suitable decoding apparatus 30. The apparatus 30 comprises a combiner block 32, an inter-carrier modulation detection block 34 and an intra-carrier demodulation block 36.

The blocks may be implemented using software, hardware or a combination of software and hardware.

The inter-carrier detection block 14 decodes the first information portion 13 by detecting the modulation type of each subcarrier. The detected modulation type assigns a value to the carriers associated index according to a grammar. The assigned values, ordered according to the ordered series of indexes, provide a data word 22 representing the first information portion 11 as illustrated in FIG. 3F.

The intra-carrier demodulation block, receives data 17 identifying the allocation of modulation types to subcarriers, and decodes a data word 24, representing the second information portion 15, by demodulation of a subset of the subcarriers.

The combiner block 32 combines the first information portion 13 and the second information portion 15 to recreate the information 11.

In the, example illustrated in FIGS. 3A-3G, two different modulation types are illustrated M1 and M2.

In one embodiment, the first modulation type M1 may modulate an allocated subcarrier with a first fixed amplitude and the second modulation type modulates an allocated subcarrier with a second fixed amplitude. The fixed amplitudes may be used to enable on-off keying (OOK) in which only the first modulation type is used to encode the second information portion 15. On-Off keying is enabled by letting the second amplitude represent suppression of subcarriers and the first amplitude represent non suppression of the subcarriers.

Different power control strategies may be used in the event that subcarriers are suppressed. Suppression of a subcarrier means that it is not transmitted and therefore has zero associated power.

In one power control strategy, there is no reallocation of power. If a subcarrier is suppressed then that power is saved.

In a different power control strategy, there is reallocation of power. The total transmit power is kept constant, with the power per subcarrier increasing as more subcarriers are suppressed. This results in an increase in power per subcarrier. There is therefore a better signal to noise ratio, and a reduced bit-error ratio or there is an opportunity to select a higher order modulation scheme that results in even higher transmission rates.

In other embodiments, both modulation types M1, M2 may be used to encode the second information portion 15.

In other embodiments, both modulation types M1, M2 may be used to encode the second information portion 15 and an additional third information portion 40. One example of this will now be described with reference to FIG. 1 and FIGS. 4A to 4I.

At block 4, information 11' is divided by splitter block 12 into at least a first information portion 13, a second information portion 15 and a third information portion 40.

As illustrated in FIG. 4A, the information 11' may be a series of information bits, such as, for example the series of binary bits illustrated.

As illustrated in FIGS. 4B, 4C and 4D, the first information portion 13, the second information portion 15 and the third information portion 40 are non-overlapping portions of the information 11'.

Referring back to FIG. 1, at block 6 the first information portion 13 is encoded, at the inter-carrier modulation block 14, by allocating at least two different modulation types to a plurality of orthogonal frequency division multiplex (OFDM) subcarriers.

An example of an allocation of different modulations types M1, M2 to orthogonal subcarriers F1 to F8 is illustrated in FIG. 4D. This Fig illustrates a modulation map 17 that records which modulation type is allocated to which subcarrier. Encoding of the first information portion 13, results in different modulation types being used with the subcarriers. In this example, a first subset of the eight subcarriers (subcarriers F1, F4, F6, F7) are modulated using the first type of modulation M1. A second subset of the eight subcarriers (subcarriers F2, F3, F5, F8) are modulated using the second type of modulation M2.

Referring back to FIG. 1, next at block 8 the second information portion 15 is encoded, at the intra-carrier modulation block 16, by modulation of subcarriers belonging to the first subset of the plurality of subcarriers.

Referring to FIG. 4F, a symbol map 42 records which symbols are modulated onto which subcarriers.

The second information portion 15 is divided into symbols and each symbol is modulated, in order, onto a subcarrier. In this example, all the symbols are modulated onto only the first subset of the eight subcarriers (subcarriers F1, F4, F6, F7).

Referring back to FIG. 1, next block 8 is repeated using the third information portion 40. At block 8 the third information portion 40 is encoded, at the intra-carrier modulation block 16, by modulation of subcarriers belonging to the second subset of the plurality of subcarriers.

In this example, the third information portion 40 is divided into symbols and each symbol is modulated onto one of the second subset of the subcarriers (subcarriers F2, F3, F5, F8).

At the decoder 30, the inter-carrier detection block 14 decodes the first information portion 13 by detecting the modulation type of each subcarrier. The detected modulation type assigns a value to the carriers associated index according to a grammar. The assigned values, ordered according to the ordered series of indexes, provide a data word 22 representing the first information portion 11 as illustrated in FIG. 4G.

The intra-carrier demodulation block, receives data 17 identifying the allocation of modulation types to subcarriers. It decodes the second information portion 15 by using the appropriate demodulation technique (for modulation type M1) on the subcarriers identified as using the modulation type M1. This demodulation produces the data word 24 which reproduces the second information portion 15. It decodes the third information portion 15 by using the appropriate demodulation technique (for modulation type M2) on the subcarriers identified as using the modulation type M2. This demodulation produces the data word 44 which reproduces the third information portion 40.

The combiner block 32 combines the first information portion 13, the second information portion 15 and the third information portion 40 to recreate the information 11'.

The first modulation type M1 and the second modulation type M2 have different orders. In the illustrated example, the first modulation type M1 has a higher order than the second modulation type M2. The first modulation type uses symbolic modulation, where the symbol length L1=2. The second modulation type uses symbolic modulation, where the symbol length L2 is different to L1. In this example, the second modulation is of a lower order (L2<L1) as L2=1.

M-QAM modulation may, for example, be used as the first modulation type M1. Binary phase shift keying BPSK may, for example, be used as the second modulation type M2.

This implementation results in an improved spectral efficiency compared to the on-off keying embodiment described previously but at the cost of increased complexity at the receiver 30.

At block 6 in FIG. 1, the first information portion 13 is encoded by selecting which modulation type is allocated to which subcarrier according to a grammar that applies meaning to which modulation type is allocated to which subcarrier. In the example of FIG. 3D, it can be observed that the grammar assigns the modulation type M1 to bit values of 1 in the first information portion 13 and the modulation type M2 to a bit values of 0 in the first information portion 13. This grammar defines a particular first information encoding scheme.

It is possible to define different first information encoding schemes using different grammars.

For example, a different grammar could assigns the modulation type M1 to bit values of 0 in the first information portion 13 and the modulation type M2 to a bit values of 1 in the first information portion 13. This grammar defines a different first information encoding scheme.

FIG. 5 schematically illustrates a method 50 for selecting an encoding scheme from a plurality of different encoding schemes, each of which has a different allocation of modulation types to the subsets of the first information portion 13.

At block 52, the first information portion 13 is analysed.

There may be a putative allocation of a first encoding scheme to the first information portion 13. A quantitative value indicative of the available bandwidth for encoding the second information portion 15 may then be determined.

There may be a putative allocation of a second encoding scheme to the first information portion 13. A quantitative value indicative of the available bandwidth for encoding the second information portion 15 may then be determined.

At block 53, the encoding scheme with the greatest available bandwidth may then be selected. The selected encoding scheme determines how at least two different modulation types are allocated amongst the plurality of subcarriers in dependence upon the first information portion 13 and maximises the available bandwidth for the remaining information portions.

As an example, consider the situation when the first information portion 13 has the information bits 11010110. The first information portion 13 has a first subset of information bits {1 1_1_1 1_} and a second subset of information bits {___0_0___0}.

According to a first encoding scheme, a bit value of 1 in the first information portion is associated with modulation type M1 and a bit value of 0 in the first information portion is associated with modulation type M2. The modulation type M1 corresponds to symbol encoding and the modulation type M2 corresponds to carrier suppression (on-off keying). Consequently there will be five subcarriers allocated to the first modulation type M1, each of which can communicate a symbol. The bandwidth is therefore five symbols.

According to a second encoding scheme, a bit value of 1 in the first information portion is associated with modulation type M2 and a bit value of 0 in the first information portion is associated with modulation type M1. The modulation type M1 corresponds to symbol encoding and the modulation type M2 corresponds to carrier suppression (on-off keying). Consequently there will be three subcarriers allocated the first modulation type M1, each of which can communicate a symbol. The bandwidth is therefore three symbols.

The first encoding scheme is therefore selected and used. The majority subset of the first subset (1's) and the second subset (0's) determines the encoding scheme in this example. The majority subset of the first information portion may be identified by calculating the Hamming weight of the first information portion 13 at block 52.

The available bandwidth is five symbols but only four symbols are required to encode the second information portion 15. There is therefore an additional symbol for use. In some embodiments this symbol is used to encode again a symbol of the second information portion. This degenerate encoding increases the quality. In another embodiment, this symbol is used to indicate the selected encoding scheme to the receiver 30. In other configurations of the first information portion 13 there may be more than one extra symbol available and these symbols may be used for degenerate encoding and indicating the selected encoding scheme.

As another example, consider the situation when the first portion has the information bits 00010110. The first information portion 13 has a first subset of information bits {0 0_0_0 0_} and a second subset of information bits {___1_1___1}.

According to a first encoding scheme, a bit value of 0 in the first information portion is associated with modulation type M1 and a bit value of 1 in the first information portion is associated with modulation type M2. The modulation type M1 corresponds to symbol encoding and the modulation type M2 corresponds to carrier suppression (on-off keying). Consequently there will be five subcarriers allocated to the first modulation type M1, each of which can communicate a symbol. The bandwidth is therefore five symbols.

According to a second encoding scheme, a bit value of 0 in the first information portion is associated with modulation type M2 and a bit value of 1 in the first information portion is associated with modulation type M1. The modulation type M1 corresponds to symbol encoding and the modulation type M2 corresponds to carrier suppression (on-off keying). Consequently there will be three subcarriers allocated the first modulation type M1, each of which can communicate a symbol. The bandwidth is therefore three symbols.

The first encoding scheme is therefore selected and used. The majority subset (0's) of the first subset (0's) and the second subset (1's) determines the encoding scheme in this example. The majority subset of the first information portion 13 may be identified by calculating the Hamming weight of the first information portion 13 at block 52.

The available bandwidth is five symbols but only four symbols are required to encode the second information portion 15. There is therefore an additional symbol for use. In some embodiments this symbol is used to encode again a symbol of the second information portion. This degenerate encoding increases the quality. In another embodiment, this symbol is used to indicate the selected encoding scheme to the receiver. It other configurations of the first information portion 13 there may be more than one extra symbol available and these symbols may be used for degenerate encoding and indicating the selected encoding scheme.

As the encoder can use any one of a plurality of different encoding schemes for encoding the first information portion 13, then the receiver 30 will need to take this into account.

According to one embodiment, the receiver makes no assumption as to the encoding scheme used and performs the decoding process for each predetermined scheme. Error correction techniques are then used to determine which of the information 11 produced for each scheme is the most accurate. However, this requires significant processing at the receiver 30 and may require the introduction of forward error correcting codes which reduces bandwidth.

According to another embodiment, the encoder apparatus 10 signals the encoding scheme used to the receiver apparatus 30. The signalling may be done independently of the subcarriers 19 or it may utilize the subcarriers 19. For example, the signalling may utilize an extra symbol as described above.

In the example given above, a frequency domain resource is divided into domain subunits (subcarriers). Each of the domain subunits forms one of a plurality of multiplexed wireless channels. Each of the domain subunits is orthogonal and each is separately indexed by a domain resource index.

The encoding of the first information portion by allocating at least two different modulation types to a plurality of subcarriers allocates an operational pattern to the plurality of wireless channels/domain subunits. The channel/subunit has a plurality of potential different states and the first information is communicated by allocating a state to each channel/subunit. The collection of states form the operational pattern.

In other embodiments, a different domain resource is divided into domain subunits. Each of the domain subunits forms one of a plurality of multiplexed wireless channels. Each of the domain subunits is orthogonal and each is separately indexed by a domain resource index. The encoding of the first information portion allocates an operational pattern to the plurality of wireless channels/domain subunits. The channel/subunit has a plurality of potential different states and the first information is communicated by allocating a state to each channel/subunit. The collection of states form the operational pattern.

Figures 7, 8:
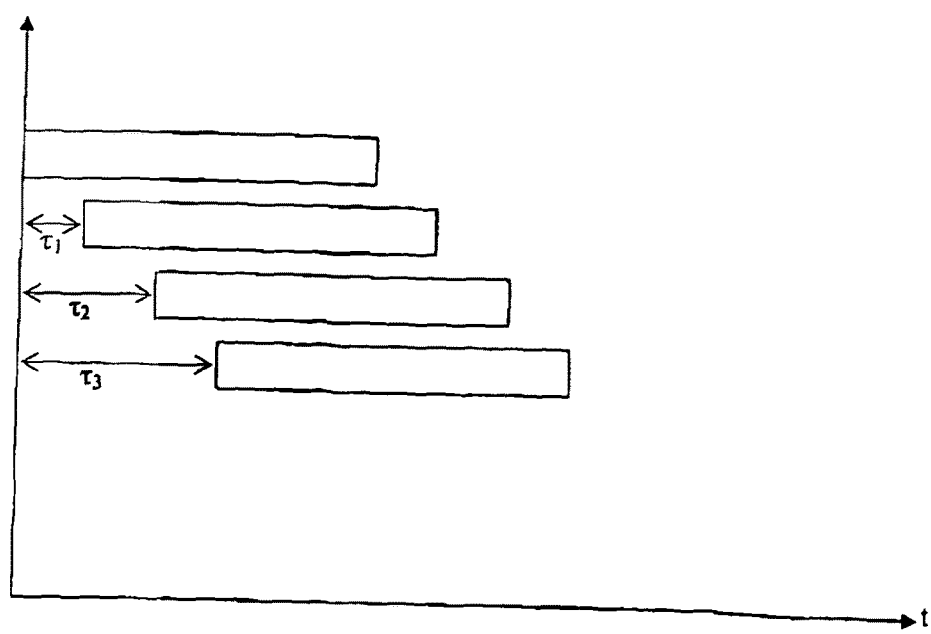
FIG. 7 schematically illustrates a time-frequency block.
FIG. 8 illustrates a cyclic delay diversity modulation scheme.

Thus different domain resources may be used in addition to or as an alternative to the frequency domain resource. Examples of domains include the time domain where the channels/subunits are time slots, the spatial domain where the channels/subunits are antenna locations or beams. Another technique that may be used for encoding information is cyclic delay diversity. As illustrated in FIG. 8, in this technique, data streams may be offset by a variable delay. Information can be encoded by associating data values to specified delays, for example, by associating a binary bit zero with no delay and associating a binary bit one with the presence of a delay.

The index-modulation concept can be applied to multiple domains/channels (i.e. spatial, time slot, frequency) by having different groups of M1 and M2 for different domain/channel-subunits.

In the time domain, a transmission frame is subdivided into smaller time units of equivalent (however, not necessarily) length (time slots). We can index each time slot, and can assign different information to each of the time slots—similar to OOK the subcarriers described above. Thus first information 10 may be encoded to two consecutive time slots, by allowing the first slot to include modulated information (second information) and keeping the second time slot empty.

In the spatial domain, in MIMO (multiple-input-multiple-output) systems such as beam forming systems, we have multiple beams and can index the beams. Thus first information 10 may be encoded to two adjacent beams, by allowing the first beam to convey modulated information (second information) and preventing the second beam from conveying information (e.g. by switching it off).

It is possible to simultaneously use two or more domains. The first information is divided into subsections, one for each domain.

For example, consider FIG. 7. This Figure illustrate the encoding of a first subsection 1101 of the first information using four channel/subunits in the frequency domain and the encoding of a second subsection 1001 using four subunits/channels in the time domain.

For example, consider a scenario of 4 subcarriers associated with the binary word 1101, and 4 time slots associated with the binary word 1001.

For the frequency domain we can define two groups of modulation levels each of size 2, i.e. G1:{M1:off, M2:8-QAM}, and G2:{M1:BPSK, M2:4-QAM}.

Now, the binary word 1101 can be mapped to the frequency domain as follows G1 G1 G2 G1.

Similarly, the binary word 1001 can be mapped to the time domain as follows M1 M2 M2 M1. The resultant time-frequency block (chunk) can be found in the Figure.

Although the above example shows encoding of a first subsection of the first information using the frequency domain and the encoding of a second subsection using the time domain, i.e. two dimensional encoding, it will be appreciated that the first information can be encoded using more than two domains. An example of this is shown in FIG. 9, which illustrates encoding of the first information using the frequency, time and spatial domains, i.e. three dimensional encoding.

Figure 9:
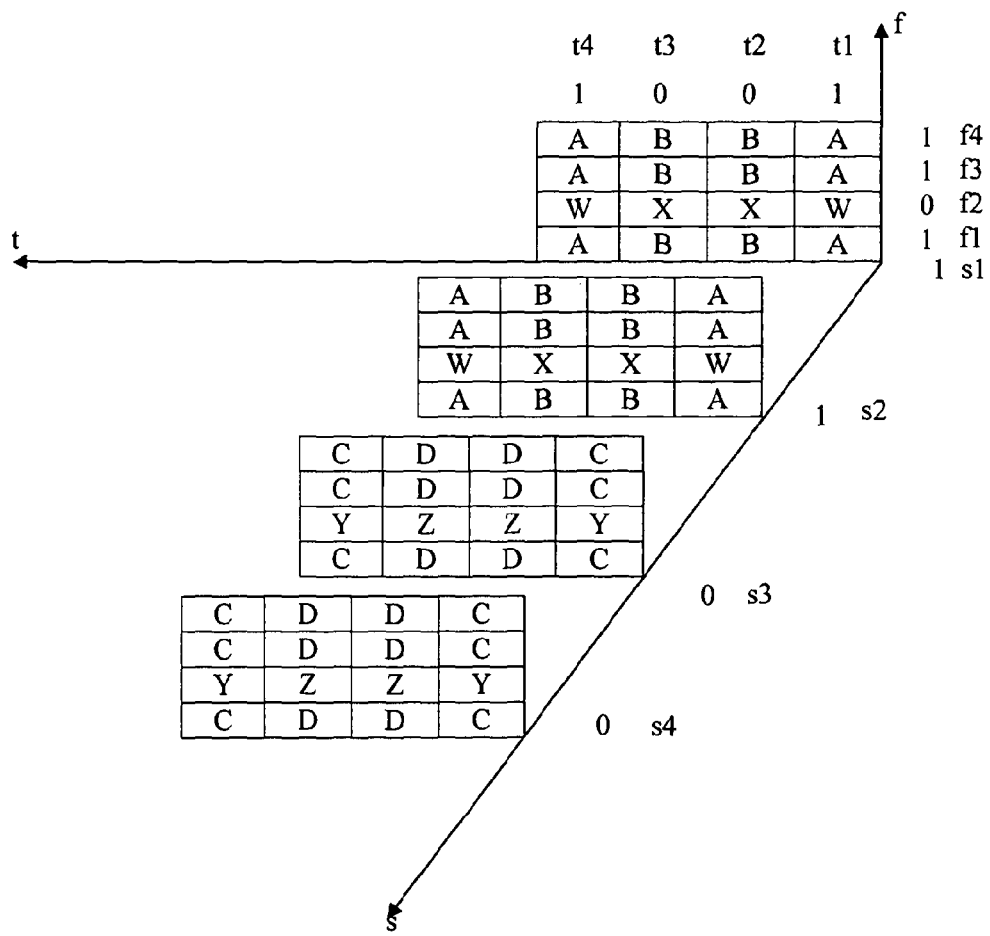
FIG. 9 schematically illustrates a time-frequency-spatial block.

In the example of FIG. 9, a first subsection of the first information is encoded using the frequency domain, a second subsection of the first information is encoded using the time domain and a third subsection of the first information is encoded using the spatial domain, for example, through the use of a MIMO system as described above. The example of FIG. 9 illustrates four sub carriers f1, f2, f3 and f4 in the frequency domain, four time slots t1, t2, t3 and t4 in the time domain and four spatially separated beams s1, s2, s3 and s4 in the spatial domain. It will be appreciated that other amounts of frequency sub carriers, time slots or beams could be used and that the amount of each need not be the same.

For the frequency domain, two groups G3 and G4 of modulation schemes are defined, each group comprising four modulation types G3:{A, B, C, D} and G4:{W, X, Y, Z}. As in the previous examples, the modulation types A, B, C, D, W, X, Y and Z may be selected from a wide range of suitable distinct modulation types known in the art, such as OOK, BPSK, 4-QAM, and the like. In this way, using modulation types A, B, C or D from the first group G3 for a particular frequency sub carrier indicates a binary value of 1, whilst use of modulation types W, X, Y or Z from the second group G4 for a particular frequency sub carrier indicates a binary value of 0.

For the time domain, two groups G5 and G6 of modulation types are defined, each group comprising four modulation types G5:{A, C, W, Y) and G6: {B, D, X, Z}. Use of modulation types A, C, W or Y from group G5 for a particular time slot indicates a binary value of 1, whilst use of modulation types B, D, X or Z from group G6 for a particular time slot indicates a binary value of 0.

For the spatial domain, two groups G7 and G8 of modulation types are defined, each group comprising four modulation types G7:{A, B, W, X} and G8: {C, D, Y, Z}. Use of modulation types A, B, W or X from group G7 for a particular beam indicates a binary value of 1, whilst use of modulation types C, D, Y or Z from group G8 for a particular beam indicates a binary value of 0.

Therefore, referring to FIG. 9, it can be seen that, regardless of time slot or beam, modulation types A, B, C or D from group G3 are used for each of frequency sub carriers f1, f2 and f4 and modulation types W, X, Y or Z from group G4 are used for frequency sub carrier f3. Therefore, in this case, the binary word 1 1 0 1 is encoded using the frequency domain.

In the time domain, modulation types A, C, W or Y from group G5 are used for each of time slots t1 and t4, whilst modulation types B, D, X or Z from group G6 are used for each of the time slots t2 and t3. Therefore, in this case, the binary word 1 0 0 1 is encoded using the time domain.

Similarly, only modulation types A, B, W or X from the group G7 are used for spatial beams s1 and s2, whilst only modulation types C, D, Y or Z from the group G8 are used for spatial beams s3 and s4. Therefore, in this case, the binary word 1 1 0 0 is encoded using the spatial domain.

In this way, three or more dimensions or domains can be used in order to increase the amount of information from the first block of information that can be encoded. It will be appreciated that other domains or techniques may be used instead of or in addition to the frequency, time and spatial domains described in relation to FIG. 9.

Figure 10:
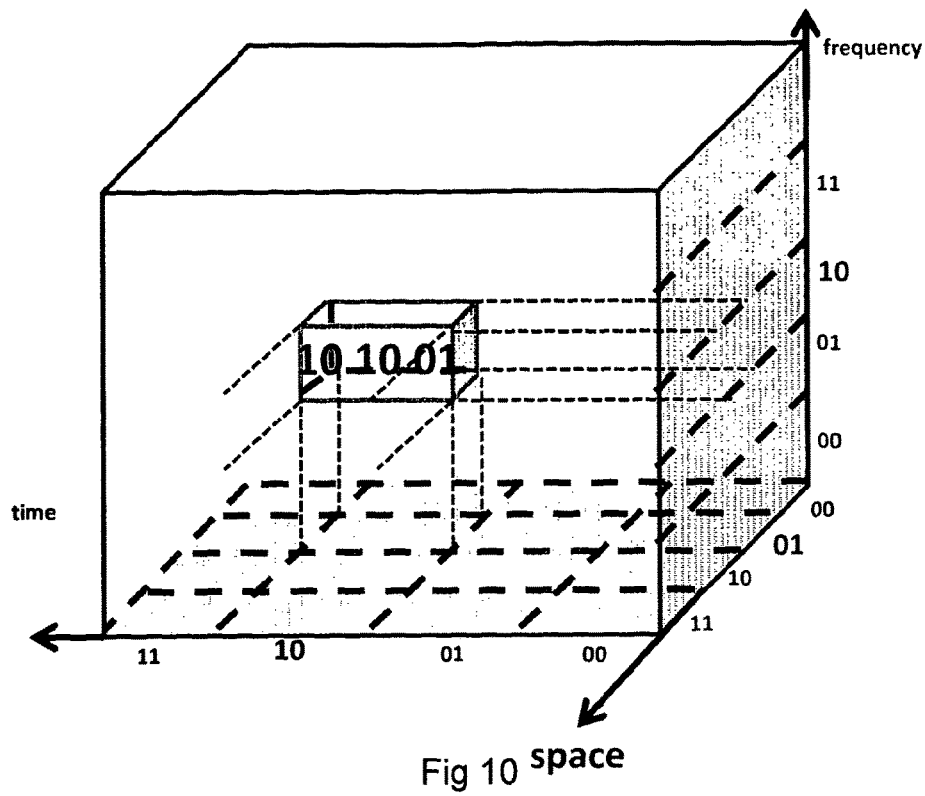
FIG. 10 schematically illustrates an example of multi-domain encoding.

Another scheme for encoding the first information portion using multiple domains is shown in FIG. 10. In this example, each discrete domain unit in each domain is assigned a value. In the example of FIG. 10, each sub-carrier in the frequency domain, each time slot in the time domain and each beam in the spatial domain is assigned a binary value, such as 0 0, 0 1, 1 0 or 1 1. Therefore, providing a signal in a bin formed by a particular frequency sub-carrier, on a particular beam and in a particular time slot would be indicative of a value formed by combining the values associated with the particular frequency sub-carrier, time slot and beam. In the example shown in FIG. 10, a signal is provided using the frequency sub-carrier associated with the binary value 1 0, in the time slot associated with the binary value 1 0 and using the beam associated with the binary value 0 1. Therefore, this signal is representative of the value 1 0 1 0 0 1. In this way, the total number of bits that can be encoded is $\log_2(N\_f)+\log_2(N\_s)+\log_2(N\_t)$, where N_f is the total number of frequency sub-carriers, N_s is the total number of beams and N_t is the total number of time slots.

The signal provided in each bin formed by a frequency sub-carrier, a time slot and a beam, may be subjected to a second modulation scheme, such as M-QAM, for encoding the second information portion. In this case, the total number of bits transmitted in each transmission is:

$$\log_2(N\_s)+\log_2(N\_t)+\log_2(N\_f)+\log_2(M)$$

If the number of frequency sub-carriers is 64 and the sampling frequency is 25 MHz, then the duration of one time slot is:

$$1/f\_s*N\_f=2.56\mu s$$

If the example is extended such that four time slots are provided per transmission, 32 beam transmitters are provided and 256-QAM is used, then for one transmission, the maximum data rate for this example is:

$$\log_2(32)+\log_2(4)+\log_2(64)+\log_2(256)/(4*2.56\mu s)$$
$$=2.05 \text{ Mbps}$$

By using this method, significant energy savings can be achieved. The number of bins in this example is 4*32*64=8192, which means that 1/8192 of the energy is used for the transmission.

As in the previous examples, more than one modulation scheme may be used to encode the data within the bins. For example, if all the sub-carriers in one of the domains, such as the frequency domain, were used for the transmission, and a first modulation type such as OOK was used for a first subset of the frequency sub-carriers and a second modulation type such as 256-QAM was used in the remaining frequency subcarriers, the achievable data rate would be (for 4 time slots, 32 beam transmitters, 32 frequency sub-carriers encoded using OOK and 32 frequency sub-carriers encoded using 256-QAM):

$$\log_2(4)+\log_2(32)+32\text{sub-carriers}(\times1 \text{ bit per bin of } OOK)+32\text{sub-carriers}(\times8 \text{ bits per bin for 256-QAM})/(4*2.56 \mu s)=28.81 \text{ Mbps}$$

This example would use $1/(N\_t*N\_s*2)=1/130$ of the energy that would be used if all time slots, all transmitters and all frequency sub-carriers were used.

Figure 11:
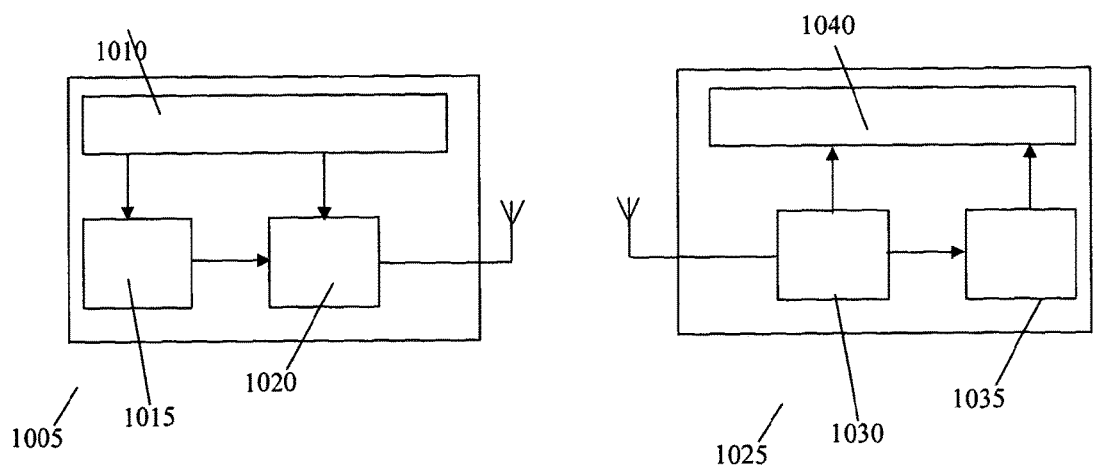
FIG. 11 schematically illustrates a transmitting and receiving apparatus suitable for applying multi-domain encoding.

Suitable apparatus for applying these multi domain techniques is illustrated in FIG. 11. It will be seen from this that a transmitter 1005 is provided with a splitter 1010 for splitting the data into at least a first section and a second section, a module 1015 for applying inter-carrier modulation to the first portion by assigning sub-carriers of at least two and preferably at least three, domains for transmission of the signal. Each sub-carrier in each domain is associated with a value. A grammar is used to store the values associated with each sub-carrier in each domain. The first data is divided into portions and each portion is assigned to a sub-carrier in a domain with an associated value equal to the value of the portion of the first data. A module 1020 for encoding the second data using intra-carrier modulation, for example, by applying a modulation scheme such as OOK or 256-QAM to the signal, is also provided.

By determining the sub-carriers in each domain used to transmit the signal and applying the grammar that indicates which sub-carriers in each domain are indicative of which values, the first data may be reconstructed. On receipt of the signal, the receiver 1025 de-modulates the received signal using a suitable demodulator 1035 to recover the second information portion and a module 1030 is provided for identifying the sub-carriers used for transmission and comparing the identified sub-carriers with the grammar in order to determine the first information portion. The original information signal can then be reconstructed by combining the portions of the first information and the second information using a combiner 1040.

Reference has been made to various examples in the preceding description. It should be understood that reference to an example implies that alternative, but not necessarily explicitly disclosed implementations can be used.

As used herein the term orthogonal may mean strictly orthogonal or substantially orthogonal (i.e. not significantly correlated).

The blocks illustrated in FIG. 1 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of communicating information in a plurality of carrier waves, the method comprising the steps of:

dividing the information into at least a first information portion and a second information portion, wherein the information portions are non-overlapping series of binary bits;

modulating a plurality of domain resources to encode the first information portion using an index or grammar which indicates a modulation type for the plurality of domain resources; and encoding the second information portion by modulation of domain resources on respective carrier waves belonging to a subset of the plurality of domain resources used to encode the first information portion, and combines the encoded first and second information portions to recreate the information in the plurality of carrier waves, wherein:

modulation of the plurality of domain resources to encode the first information portion comprises a first information encoding scheme for allocating at least two different modulation types for encoding information to the plurality of domain resources with which the first information portion is to be encoded;

each of the at least two different modulation types and their allocation represents or encodes a different part or subset of the first information portion;

the plurality of domain resources comprise domain resources of two or more domains; and selecting the first information encoding scheme, for determining the allocation of the at least two different modulation types amongst the plurality of domain resources, by analyzing the first information portion and determining a quantitative value indicative of the available bandwidth for encoding remaining information portions, that maximizes the available bandwidth for the remaining information portions.

2. A method as defined by claim 1, wherein encoding the first information portion comprises selecting which modulation type is allocated to which domain resource according to the index or grammar, which applies meaning to which modulation type is allocated to which domain resource.

3. A method according to claim 1, wherein the modulation of the plurality of domain resources to encode the first information further comprises encoding a part of the first information portion using one or more domain resources of a first domain and another part of the first information portion is encoded using one or more domain resources of a second domain.

4. A method according to claim 3, wherein the modulation of the plurality of domain resources to encode the first information further comprises encoding at least a further part of the first information portion using one or more domain resources of a third domain.

5. A method according to claim 3, wherein the first, second and/or third domains comprise the frequency, time and/or spatial domains and/or the domain resources comprise sub-channels of a frequency domain, beams arranged in a spatial domain and/or time slots in a time domain.

6. A method as claimed in claim 3, wherein values are associated with domain resources of at least one domain and wherein at least part of the first information portion is encoded by providing a signal using a domain resource indicative of the value of the portion of at least the part of the first information portion.

7. A method as claimed in claim 6, wherein values are associated with domain resources of at least two domains, and wherein the first information portion is at least partially encoded by providing a signal using domain resources from the at least two domains indicative of the value of parts of the first information portion.

8. A method as claimed in claim 1, wherein:
the first information portion comprises a first subset of information bits and a second subset of information bits, and
the method is further comprising the step of selecting a first information encoding scheme from a plurality of different first information encoding schemes, each of which has a different allocation of modulation types to the first and second subsets.

9. A method as claimed in claim 8, wherein the plurality of different first information encoding schemes are predetermined and shared with a receiver.

10. A method as claimed in claim 8, further comprising transmitting control information that identifies the selected first information encoding scheme.

11. A method as claimed in claim 10, further comprising encoding the control information by modulation of subcarriers.

12. A method as claimed in claim 1, comprising:
identifying within the first information portion a first subset of information bits and a second subset of information bits;
selecting a majority subset of the first and second subsets;
using the majority subset to allocate a first modulation type to a first plurality of subcarriers.

13. A method as claimed in claim 1, further comprising utilising some of the bandwidth for encoding control information and/or for degenerate encoding a portion of the second information portion.

14. A method as claimed in claim 1, wherein the at least two different modulation types comprise a first modulation type that modulates a subcarrier with a first fixed amplitude and a second modulation type that modulates a subcarrier with a second fixed amplitude.

15. A method as claimed in claim 14, wherein the at least two different modulation types enable on-off keying (OOK), the first amplitude representing suppression of subcarriers and the second amplitude representing non suppression of the subcarriers.

16. A method as claimed in claim 1, further comprising power reallocation from suppressed subcarriers to non-suppressed subcarriers.

17. A method as claimed in claim 1, wherein the at least two different modulation types comprise a first modulation type that modulates a subcarrier with a higher order modulation and a second modulation type that modulates a subcarrier with a lower order modulation.

18. A method of communicating information in a plurality of carrier waves, the method comprising the steps of:
dividing the information into at least a first information portion and a second information portion, wherein the information portions are non-overlapping series of binary bits;
encoding the first information portion by allocating at least two different modulation types for encoding information to a plurality of subcarriers with which the first information portion is to be encoded; and
encoding the second information portion by modulation of subcarriers belonging to a subset of the plurality of subcarriers used to encode the first information portion, and combines the encoded first and second information portions to recreate the information in the plurality of carrier waves,
wherein:
each of the at least two different modulation types and their allocation represents or encodes a different part or subset of the first information portion;
the plurality of subcarriers comprise subcarriers of two or more domains; and
selecting a first information encoding scheme, for determining the allocation of the at least two different modulation types amongst the plurality of subcarriers, by analyzing the first information portion and determining a quantitative value indicative of the available bandwidth for encoding remaining information portions, that maximizes the available bandwidth for the remaining information portions.

19. A method as claimed in claim 18, wherein encoding the first information portion comprises selecting which modulation type is allocated to which subcarrier according to a grammar that applies meaning to which modulation type is allocated to which subcarrier.

20. A method as claimed in claim 18, wherein each subcarrier is associated with an index in a ordered series of indexes, wherein the modulation type of a subcarrier assigns a value to the associated index and wherein assigned values, ordered according to the ordered series of indexes, provide a data word representing the first information portion.

21. A method as claimed in claim 18, comprising: encoding the first information portion by allocating only two different modulation types to the subcarriers.

22. A transmitter apparatus comprising:
a splitter block for dividing information into at least a first information portion and a second information portion, wherein the information portions are non-overlapping series of binary bits;
an inter-carrier modulation block for encoding the first information portion by allocating at least two different modulation types for encoding information to a plurality of subcarriers with which the first information portion is to be encoded; and
an intra-carrier modulation block for encoding the second information portion by modulation of subcarriers belonging to a subset of the plurality of subcarriers used to encode the first information portion,
wherein:
each of the at least two different modulation types and their allocation represents or encodes a different part or subset of the first information portion;
the plurality of subcarriers comprise subcarriers of two or more domains; and
selecting a first information encoding scheme, for determining the allocation of the at least two different modulation types amongst the plurality of subcarriers, by analyzing the first information portion and determining a quantitative value indicative of the available bandwidth for encoding remaining information portions, that maximizes the available bandwidth for the remaining information portions.

23. A transmitter apparatus as claimed in claim 22, wherein:
the splitter block divides the information into at least a first information portion and a second information portion;
the inter-carrier modulation block modulates of a plurality of domain resources to encode the first information using an index or grammar; and
the inter-carrier modulation block encodes the second information by modulation of domain resources;
wherein:

the modulation of the plurality of domain subunits to encode the first information portion comprises allocating at least two different modulation types for encoding information to the plurality of domain subunits;

the plurality of domain subunits comprise domain subunits of two or more domains; and encoding the first information portion comprises selecting which modulation type is allocated to which domain resource according to the index or grammar, which applies meaning to which modulation type is allocated to which domain resource.

24. A transmitter apparatus comprising:

splitter circuitry configured to divide the information into at least a first information portion and a second information portion, wherein the information portions are non-overlapping series of binary bits;

inter-carrier modulation circuitry configured to encode the first information portion by allocating at least two different modulation types for encoding information to a plurality of subcarriers with which the first information portion is to be encoded; and intra-carrier modulation circuitry configured to encode the second information portion by modulation of subcarriers belonging to a subset of the plurality of subcarriers used to encode the first information portion, wherein:

each of the at least two different modulation types and their allocation represents or encodes a different part or subset of the first information portion;

the plurality of subcarriers comprise subcarriers of two or more domains; and selecting a first information encoding scheme, for determining the allocation of the at least two different modulation types amongst the plurality of subcarriers, by analyzing the first information portion and determining a quantitative value indicative of the available bandwidth for encoding remaining information portions, that maximizes the available bandwidth for the remaining information portions.

25. A method of communicating information in a plurality of carrier waves, the method comprising the steps of:

decoding first information portion, wherein the first information portion is a non-overlapping series of binary bits, by determining the allocation of at least two different modulation types for encoding information to a plurality of subcarriers with which the first information portion is encoded;

decoding second information portion, wherein the second information portion is a non-overlapping series of binary bits, by demodulation of subcarriers belonging to a subset of the plurality of subcarriers used to encode the first information portion; and combining the first information portion and the second information portion to recreate the information in the plurality of carrier waves, wherein:

each of the at least two different modulation types and their allocation represents or encodes a different part or subset of the first information portion;

the plurality of subcarriers comprise subcarriers of two or more domains; and determining a first information encoding scheme, for determining the allocation of the at least two different modulation types amongst the plurality of subcarriers, by analyzing the first information portion and determining a quantitative value indicative of the available bandwidth for encoding remaining information portions, that maximizes the available bandwidth for the remaining information portions.

26. A method as claimed in claim 25, wherein decoding the first information portion comprises determining which modulation type is allocated to which subcarrier and applying meaning according to a grammar that applies meaning to which modulation type is allocated to which subcarrier.

27. A method as claimed in claim 25, wherein each subcarrier is associated with an index in a ordered series of indexes, wherein the modulation type of a subcarrier assigns a value to the associated index and wherein assigned values, ordered according to the ordered series of indexes, provide a data word representing the first information portion.

28. A method as claimed in claim in claim 25, comprising:

determining which modulation type is allocated to which subcarrier;

decoding the first information portion according to different encoding schemes by applying meaning according to a grammar which applies a meaning to which modulation types are allocated to which subcarriers, wherein each encoding scheme has its own grammar; and selecting one of the first information portions created according to different encoding schemes.

29. A method as claimed in claim in claim 25, comprising:

identifying the encoding scheme is use; and decoding the first information portion by determining which modulation type is allocated to which subcarrier and applying meaning according to a grammar of the identified encoding scheme that applies meaning to which modulation type is allocated to which subcarrier.

30. A method as claimed in claim in claim 25, wherein the at least two different modulation types comprise a first modulation type that modulates a subcarrier with a higher order modulation and a second modulation type that modulates a subcarrier with a lower order modulation.

31. A receiver apparatus comprising:

an inter-carrier detection block for decoding first information portion, wherein the first information portion is a non-overlapping series of binary bits, by determining the allocation of at least two different modulation types for encoding information to a plurality of subcarriers with which the first information portion is encoded;

an intra-carrier detection block for decoding second information portion, wherein the second information portion is a non-overlapping series of binary bits, by demodulation of subcarriers belonging to a subset of the plurality of subcarriers used to encode the first information portion; and a combiner block for combining the first information portion and the second information portion to create information in a plurality of carrier waves, wherein:

each of the at least two different modulation types and their allocation represents or encodes a different part or subset of the first information portion;

the plurality of subcarriers comprise subcarriers of two or more domains; and determining a first information encoding scheme, for determining the allocation of the at least two different modulation types amongst the plurality of subcarriers, by analyzing the first information portion and determining a quantitative value indicative of the available bandwidth for encoding remaining information portions, that maximizes the available bandwidth for the remaining information portions.

32. A receiver apparatus as claimed in claim 31, wherein:
the inter-carrier detection block decodes first information portion by determining the allocation of at least two different modulation types for encoding information to a plurality of subcarriers;
the intra-carrier detection block decodes second information by demodulation of subcarriers belonging to a subset of the plurality of subcarriers; and
the combiner block combines the first information portion and the second information portion,
wherein decoding the first information portion comprises determining which modulation type is allocated to which subcarrier and applying meaning according to a grammar that applies meaning to which modulation type is allocated to which subcarrier.

33. A receiver apparatus comprising:
inter-carrier modulation detection circuitry configured to decode first information portion, wherein the first information portion is a non-overlapping series of binary bits, by determining the allocation of at least two different modulation types for encoding information to a plurality of subcarriers with which the first information portion is encoded;
intra-carrier demodulation circuitry configured to decode second information portion, wherein the second information portion is a non-overlapping series of binary bits, by demodulation of subcarriers belonging to a subset of the plurality of subcarriers used to encode the first information portion; and
combiner circuitry configured to combine the first information portion and the second information portion to create information in a plurality of carrier waves,
wherein:
each of the at least two different modulation types and their allocation represents or encodes different part or subset of the first information portion;
the plurality of subcarriers comprise subcarriers of two or more domains; and
determining a first information encoding scheme, for determining the allocation of the at least two different modulation types amongst the plurality of subcarriers, by analyzing the first information portion and determining a quantitative value indicative of the available bandwidth for encoding remaining information portions, that maximizes the available bandwidth for the remaining information portions.

34. A system comprising the receiver apparatus of claim 33 and a transmitter apparatus, wherein the transmitter apparatus comprises:
a splitter block for dividing the information into at least a first information portion and a second information portion;
an inter-carrier modulation block for encoding the first information portion by allocating at least two different modulation types for encoding information to a plurality of subcarriers; and
an intra-carrier modulation block for encoding the second information by modulation of subcarriers belonging to a subset of the plurality of subcarriers.

35. A method of communicating information in a plurality of carrier waves, the method comprising the steps of:
dividing the information into at least a first information portion and a second information portion, wherein the information portions are non-overlapping series of binary bits;
communicating the first information portion by allocating an operational pattern to a plurality of wireless channels, which indicates a modulation type for the plurality of domain resources;
communicating the second information portion by wireless communication via one or more of the wireless channels belonging to a subset of the plurality of wireless channels used to encode the first information portion; and
combining the communicated first and second information portions to recreate the information in the plurality of carrier waves,
wherein:
allocating the operational pattern to communicate the first information portion comprises allocating at least two different modulation types for encoding information to the plurality of wireless channels with which the first information portion is to be encoded;
each of the at least two different modulation types and their allocation represents or encodes a different part or subset of the first information portion; and
the plurality of wireless channels comprise wireless channels of two or more domains; and
determining a first information encoding scheme, for determining the allocation of the at least two different modulation types amongst the plurality of wireless channels, by analyzing the first information portion and determining a quantitative value indicative of the available bandwidth for encoding remaining information portions, that maximizes the available bandwidth for the remaining information portions.

36. A method as claimed in claim 35, wherein the wireless channels have a plurality of potential different states and wherein the first information is communicated by allocating a state for each wireless channel, wherein the collection of states form the operational pattern.

37. A method as claimed in claim 36, wherein the wireless channels include orthogonal subcarriers that have different modulation states.

38. A method as claimed in claim 36, wherein the wireless channels include time slots that have different modulation states.

39. A method of communicating information in a plurality of carrier waves, the method comprising the steps of:
dividing the information into at least a first information portion and a second information portion, wherein the information portions are non-overlapping series of binary bits;
encoding the first information portion by allocating at least two different modulation types for encoding information to a plurality of orthogonal multiplexing domain subunits with which the first information portion is to be encoded; and
encoding the second information portion by modulation of orthogonal multiplexing domain subunits belonging to a subset of the plurality of orthogonal multiplexing domain subunits used to encode the first information portion; and
combining the encoded first and second information portions to recreate the information in the plurality of carrier waves,
wherein:
each of the at least two different modulation types and their allocation represents or encodes a different part or subset of the first information portion;

the plurality of orthogonal multiplexing domain subunits comprise orthogonal multiplexing domain subunits of two or more domains; and determining a first information encoding scheme, for determining the allocation of the at least two different modulation types amongst the plurality of orthogonal multiplexing domain subunits, by analyzing the first information portion and determining a quantitative value indicative of the available bandwidth for encoding remaining information portions, that maximizes the available bandwidth for the remaining information portions.

40. A method of communicating information in a plurality of carrier waves, the method comprising the steps of:

dividing the information into at least a first information portion and a second information portion, wherein the information portions are non-overlapping series of binary bits;

encoding the first information portion using domain resource-index modulation, which indicates a modulation type for a plurality of domain resources, comprising allocating at least two different modulation types for encoding information to the plurality of domain resources with which the first information portion is to be encoded;

encoding the second information portion by modulation of domain resources one respective carrier waves belonging to a subset of the plurality of domain resources used to encode the first information portion; and combining the encoded first and second information portions to recreate the information in the plurality of carrier waves, wherein:

each of the at least two different modulation types allocated corresponds to a different part or subset of the first information portion;

the domain resources comprise domain resources of two or more domains; and determining a first information encoding scheme, for determining the allocation of the at least two different modulation types amongst the plurality of domain resources, by analyzing the first information portion and determining a quantitative value indicative of the available bandwidth for encoding remaining information portions, that maximizes the available bandwidth for the remaining information portions.

41. A method of communicating information in a plurality of carrier waves, the method comprising the steps of:

dividing the information into at least a first information portion and a second information portion, wherein the information portions are non-overlapping series of binary bits;

encoding the first information portion using inter-domain resource differentiation comprising allocating at least two different modulation types for encoding information to a plurality of domain resources with which the first information portion is to be encoded;

encoding the second information portion by modulation of domain resources on respective carrier waves belonging to a subset of the plurality of domain resources used to encode the first information portion; and combining the encoded first and second information portions to recreate the information in the plurality of carrier waves, wherein:

each of the at least two different modulation types and their allocation represents or encodes a different part or subset of the first information portion; and the domain resources comprise domain resources of two or more domains; and determining a first information encoding scheme, for determining the allocation of the at least two different modulation types amongst the plurality of domain resources, by analyzing the first information portion and determining a quantitative value indicative of the available bandwidth for encoding remaining information portions, that maximizes the available bandwidth for the remaining information portions.

42. A method of communicating information in a plurality of carrier waves, the method comprising the steps of:

dividing the information into at least a first information portion, a second information portion and a third information portion, wherein the information portions are non-overlapping series of binary bits;

encoding the first information portion by allocating at least two different modulation types for encoding information to a plurality of first orthogonal multiplexing domain subunits with which the first information portion is to be encoded;

encoding the second information portion by allocating at least two different modulation types for encoding information to a plurality of second orthogonal multiplexing domain subunits;

encoding the third information portion by modulation of orthogonal multiplexing domain subunits belonging to a subset of the plurality of first orthogonal multiplexing domain subunits used to encode the first information portion and second orthogonal multiplexing domain subunits used to encode the second information portion; and combining the encoded first, second and third information portions to recreate the information in the plurality of carrier waves, wherein:

each of the at least two different modulation types and their allocation represents or encodes a different part or subset of the first information portion;

at least one of the first or the second orthogonal multiplexing domain subunits comprise orthogonal multiplexing domain subunits of two or more domains; and determining a first information encoding scheme, for determining the allocation of the at least two different modulation types amongst the plurality of orthogonal multiplexing domain subunits, by analyzing the first information portion and determining a quantitative value indicative of the available bandwidth for encoding remaining information portions, that maximizes the available bandwidth for the remaining information portions.

43. A method of communicating information in a plurality of carrier waves, the method comprising the steps of:

dividing the information into at least N portions, wherein the N portions are non-overlapping series of binary bits;

encoding N-M portion(s) by modulation of a plurality of orthogonal multiplexing domain subunits;

encoding each one of M of the at least N portions by allocating at least two different modulation types for encoding information to a subset of the plurality of orthogonal multiplexing domain subunits used to encode the N-M portions; and combining the encoded N-M portions to recreate the information in the plurality of carrier waves,
wherein:
each of the at least two different modulation types and their allocation represents or encodes a different part or subset of the each one of M of the at least N portions;
the plurality of orthogonal multiplexing domain subunits comprise orthogonal multiplexing domain subunits of two or more domains; and
determining a first information encoding scheme, for determining the allocation of the at least two different modulation types amongst the plurality of orthogonal multiplexing domain subunits, by analyzing the first information portion and determining a quantitative value indicative of the available bandwidth for encoding remaining information portions, that maximizes the available bandwidth for the remaining information portions.

44. A method according to claim 43, wherein the method comprises encoding at least one of the M portions by allocating at least $2^M$ different modulation types for encoding information to a plurality of orthogonal multiplexing domain subunits.

45. A method as claimed in claim 43, wherein the plurality of orthogonal multiplexing domain subunits comprise domain subunits from two or more domains.

46. A method as claimed in claim 45, wherein the plurality of orthogonal multiplexing domain subunits comprise domain subunits from two or more of the frequency domain, the time domain and the spatial domain.

47. A method as in claim 43, wherein the plurality of subcarriers comprise subcarriers of two or more of the frequency domain, the time domain and the spatial domain.

48. A method of communicating information in a plurality of carrier waves, wherein:
at least a first information portion is encoded using one or more sub-units of a first domain, wherein the first information portion is a non-overlapping series of binary bits;
at least a second information portion is encoded using one or more sub-units of a second domain, wherein the second information portion is a non-overlapping series of binary bits;
encoding of the first information portion comprises allocating at least two different modulation types for encoding information to the one or more sub-units with which the first information portion is to be encoded; and
combining the encoded first and second information portions to recreate the information in the plurality of carrier waves;
each of the at least two different modulation types and their allocation representing or encoding a different part or subset of the first information portion; and
determining a first information encoding scheme, for determining the allocation of the at least two different modulation types amongst the one or more sub-units, by analyzing the first information portion and determining a quantitative value indicative of the available bandwidth for encoding remaining information portions, that maximizes the available bandwidth for the remaining information portions.

49. A method according to claim 48 comprising encoding at least a third information portion using one or more sub-units of a third domain.

50. A method as claimed in claim 48, wherein the domains comprise the frequency, time and/or spatial domains.

51. A method as claimed in claim 48, wherein values are associated with subcarriers of at least one domain and wherein a respective portion of the data is encoded by providing a signal using a sub-unit indicative of the value of the portion of at least the part of the first information portion.

52. A method as claimed in claim 51, comprising providing encoding a portion of the data by allocating at least two different modulation types to a plurality of sub-units of at least one domain.

* * * * *